United States Patent
Hama et al.

(10) Patent No.: US 7,848,084 B2
(45) Date of Patent: Dec. 7, 2010

(54) GAS-INSULATED EQUIPMENT

(75) Inventors: Hiroyuki Hama, Tokyo (JP); Hitoshi Sadakuni, Tokyo (JP); Takuya Otsuka, Tokyo (JP); Kiyoshi Inami, Tokyo (JP); Eiichi Nagao, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/720,842

(22) Filed: Mar. 10, 2010

(65) Prior Publication Data

US 2010/0165549 A1    Jul. 1, 2010

Related U.S. Application Data

(62) Division of application No. 11/434,218, filed on May 16, 2006, now Pat. No. 7,742,283.

(30) Foreign Application Priority Data

May 16, 2005    (JP) .............................. 2005-142057

(51) Int. Cl.
    *H02B 7/00*    (2006.01)
(52) U.S. Cl. ..................... 361/619; 361/612; 218/43; 218/60; 200/48 R
(58) Field of Classification Search ............ 361/600, 361/602, 604, 605, 612, 618, 619
    See application file for complete search history.

(56) References Cited

U.S. PATENT DOCUMENTS

| 5,567,924 | A | * | 10/1996 | Yano et al. ........... 218/143 |
| 5,578,806 | A | * | 11/1996 | Hofbauer et al. ........ 218/59 |
| 5,750,949 | A | * | 5/1998 | Rees et al. ............ 218/43 |
| 5,808,257 | A | * | 9/1998 | Thuries ............... 218/60 |
| 5,850,065 | A | * | 12/1998 | Yaginuma et al. ........ 218/76 |

(Continued)

FOREIGN PATENT DOCUMENTS

JP    03-093417    4/1991

(Continued)

OTHER PUBLICATIONS

M. M. Morcos et al., "Dynamics of Metallic Particle Contaminants in GIS with Dielectric-Coated Electrodes" IEEE Transactions on Power Delivery, 2000, vol. 15, No. 2, pp. 455-460, IEEE Service Center, New York, NY, US, XP-011049838.

(Continued)

*Primary Examiner*—Jayprakash N Gandhi
*Assistant Examiner*—Courtney Smith
(74) *Attorney, Agent, or Firm*—Buchanan Ingersoll & Rooney PC

(57) ABSTRACT

A gas-insulated equipment such as a gas-insulated switchgear provided according to the invention can efficiently improve dielectric strength of an entire electrode system considering electric field distribution of the electrodes and conductors and improving insulation coordination so that miniaturization of the entire device can be achieved. The gas-insulated switchgear includes insulating gas sealed within an earth metal container and an insulating spacer insulating and supporting high-voltage receiving portions. Surfaces of shielding electrodes having a larger diameter than that of high-voltage conductors are covered with thick dielectric coatings, and surfaces of the high-voltage conductors are covered with thin dielectric coatings.

11 Claims, 6 Drawing Sheets

U.S. PATENT DOCUMENTS

| | | | |
|---|---|---|---|
| 6,232,571 B1 * | 5/2001 | Starck et al. | 218/153 |
| 2004/0095711 A1 * | 5/2004 | Aoki et al. | 361/612 |
| 2005/0141176 A1 * | 6/2005 | Kikukawa et al. | 361/605 |
| 2006/0254791 A1 * | 11/2006 | Hama et al. | 174/22 C |

FOREIGN PATENT DOCUMENTS

| | | |
|---|---|---|
| JP | 5-030626 | 2/1993 |
| JP | 9-200915 | 7/1997 |
| JP | 2004-222483 | 8/2004 |

OTHER PUBLICATIONS

V. N. Borin et al., "Dielectric Coatings for Gas-Insulated High-Voltage Equipment" Sixth International Conference on Gas Discharges and Their Applications, 1980, vol. 1, pp. 208-209, XP-008085943.

European Search Report Application/Patent No. 06010100.3-1231 dated Nov. 28, 2007.

* cited by examiner

[quoted from the Electricity Society: *Electric Discharge Handbook*, Ohmsha, 1998]

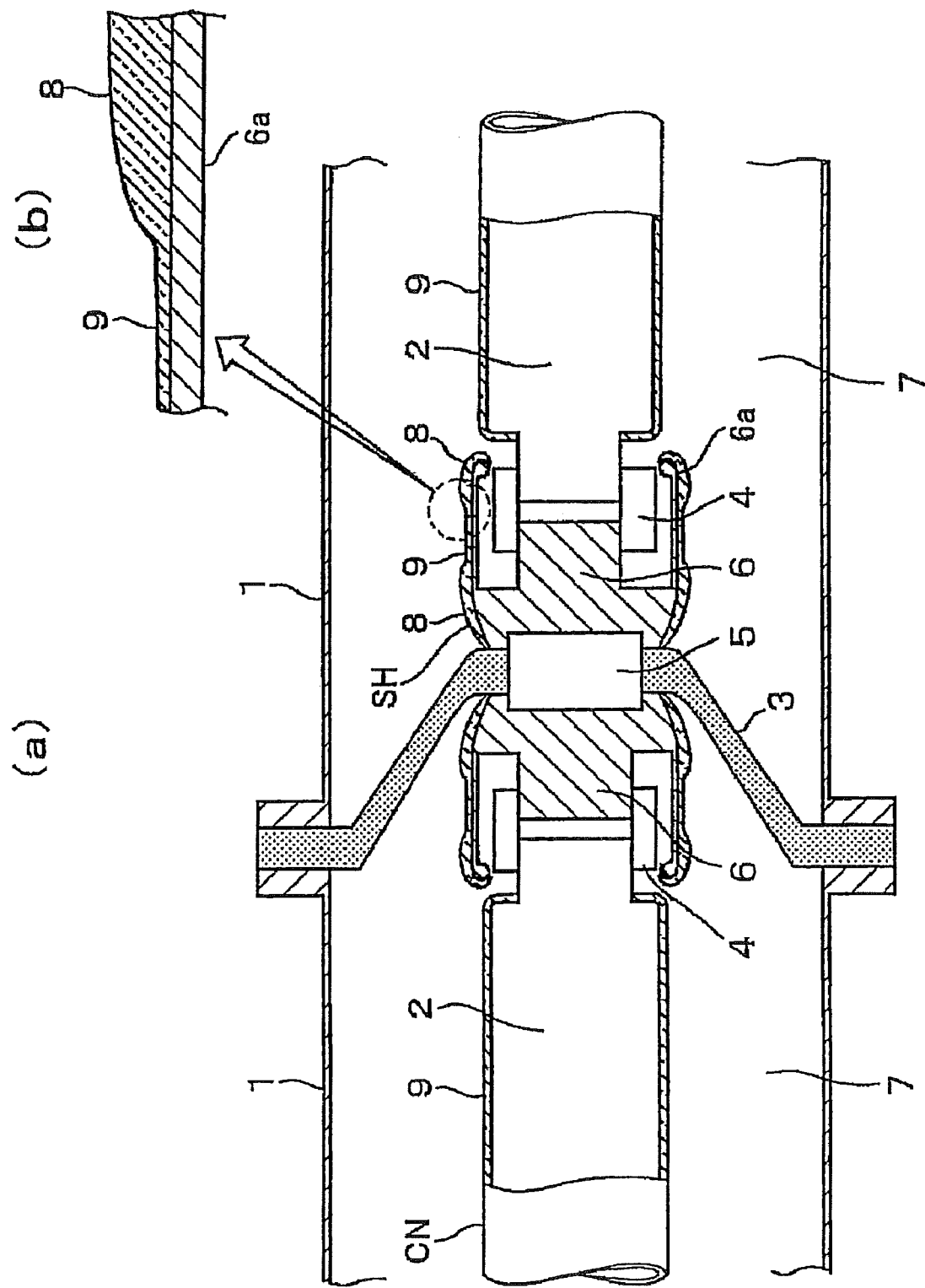

GAS-INSULATED EQUIPMENT

CROSS-REFERENCE TO RELATED APPLICATIONS

The present application is a divisional application of U.S. patent application Ser. No. 11/434,218, filed May 16, 2006, the contents of which is incorporated herein by reference in its entirety, and claims priority to JP 2005-142057, filed May 16, 2005.

BACKGROUND OF THE INVENTION

1. Field of the Invention

The present invention relates to a gas-insulated equipment, and more particularly to a gas-insulated equipment such as a gas-insulated switchgear which is miniaturized through improvement in its insulation capability.

2. Background Art

A conventional gas-insulated switchgear has a connection between high-voltage conductors, and shielding electrodes having a larger diameter than that of the high-voltage conductors are provided at the connection to reduce electric field thereat. The maximum electric field is generated at the shielding electrodes, and the ratio of the maximum electric field intensity to the electric field intensity at the high-voltage conductors is generally about 1.25:1. For miniaturizing the gas-insulated switchgear, dielectric strength in the vicinity of the area at which the maximum electric field is generated needs to be increased, and a method of improving dielectric strength by covering the metal electrode surface in this area with thick dielectric coating has been disclosed (for example, see JP-A-2004-222483, pp. 3-6, FIGS. 7 and 11).

According to the above related-art method, the dielectric strength of the thick dielectric coating is approximately 1.45 times larger than that of a bare electrode. However, since the ratio of the maximum electric field intensity of the shielding electrode to the electric field intensity of the high-voltage conductor is about 1.25:1 as mentioned above, the dielectric strength of the bare electrode high-voltage conductor is insufficient. Thus, improvement in the dielectric strength of the entire electrode system needed for miniaturization of the device cannot be attained.

SUMMARY OF THE INVENTION

Accordingly, it is an object of the invention to provide a gas-insulated equipment capable of efficiently improving dielectric strength of the entire voltage-stressed area of the gas-insulated equipment considering electric field distribution of the area and improving insulation coordination so that miniaturization of the entire device can be achieved.

A gas-insulated equipment according to the invention includes: voltage-stressed areas to which predetermined voltage is applied, relatively high electric field including the maximum electric field being generated at first voltage-receiving portions of the voltage-stressed areas, and relatively lower electric field than that generated at the first voltage-receiving portions being generated at second voltage-receiving portions at least as a part of the voltage-stressed areas other than the first voltage receiving portions; a conductive container for accommodating the voltage-stressed areas; and insulating gas for electrically insulating the voltage-stressed areas. The first voltage-receiving portions are covered with relatively thick dielectric coatings. The second voltage-receiving portions are covered with relatively thin dielectric coatings.

The gas-insulated equipment provided according to the invention is capable of efficiently improving dielectric strength of the entire voltage-stressed area considering electric field distribution of this area and improving insulation coordination so that miniaturization of the entire device can be achieved.

BRIEF DESCRIPTION OF THE DRAWINGS

FIGS. 6A and 6B are cross-sectional views showing a structure example of a gas-insulated switchgear, where 90% or a larger part of the area at which the maximum electric field is generated is covered with thick dielectric coating, and the rest of the area is covered with thin dielectric coating, those two coatings being smoothly connected with stepwise variation in the thickness thereof at the boundary.

DESCRIPTION OF THE PREFERRED EMBODIMENTS

First Embodiment

Figure 1:
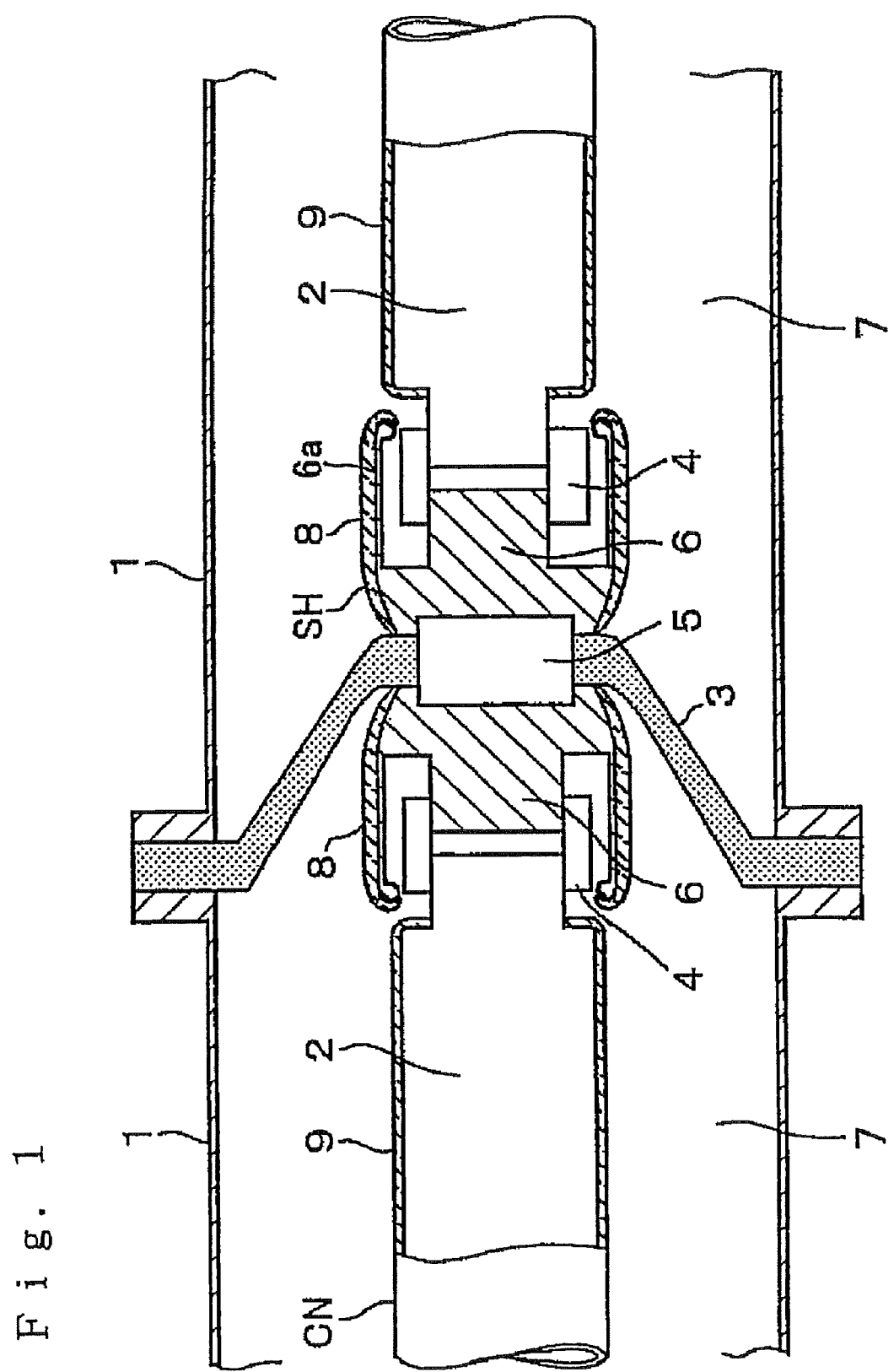
FIG. 1 is a cross-sectional view of a gas-insulated switchgear in a first embodiment according to the invention.
Figure 2:
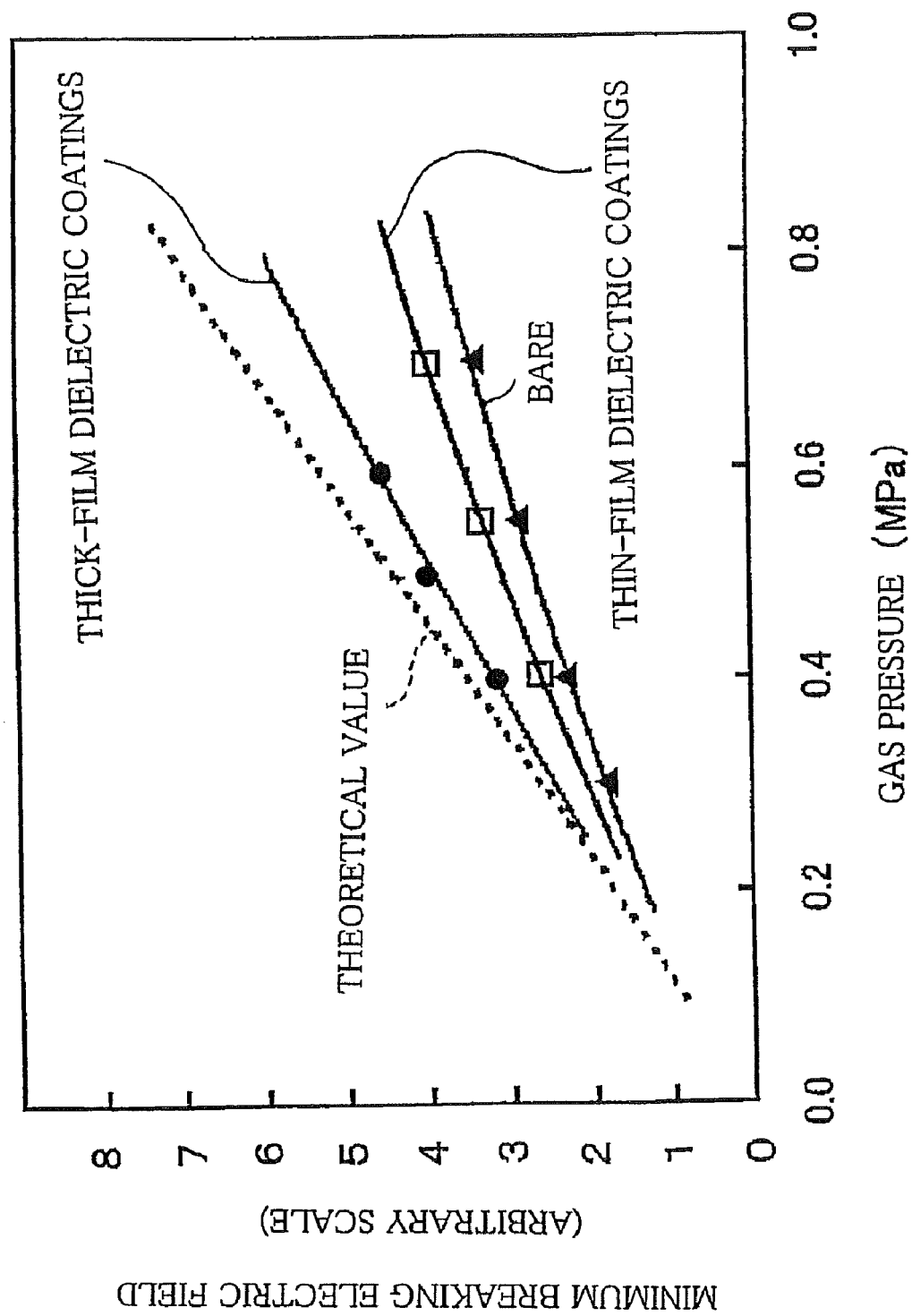
FIG. 2 is a characteristic diagram showing relationships between gas pressure and the minimum breakdown electric fields generated at thick dielectric coating, thin dielectric coating, and bare electrode as basic data for the invention.

A first embodiment according to the invention is hereinafter described with reference to FIGS. 1 and 2. FIG. 1 is a cross-sectional view of a structure of a gas-insulated switchgear in the first embodiment according to the invention. FIG. 2 is a characteristic diagram showing relationships between gas pressure and the minimum breakdown electric fields generated at thick dielectric coating, thin dielectric coating, and bare electrode as basic data of the invention.

FIG. 1 illustrates the gas-insulated switchgear in the first embodiment according to the invention, particularly showing a connection between parts. In this example, an insulating spacer 3 is used to connect one and the other earth metal containers 1, and one and the other high-voltage conductors 2. Shielding electrodes 6 having a larger diameter than that of the high-voltage conductors 2 are also provided to reduce electric field at live contacts 4, which form an electric path at the connection, and an embedded energizing electrode 5 of the insulating spacer 3.

Shield coverings 6a are provided on the shielding electrodes 6 which produce electric field shield SH to form the outer peripheries of the shielding electrodes 6. The high-voltage conductors 2 provide high-voltage conductor sections CN. The shielding electrodes 6 are disposed at the portions where relatively high intensity electric field including the maximum electric field is generated, and have a relatively large diameter so as to decrease the electric field intensity. The high-voltage conductors 2 are disposed at the portion where relatively low intensity electric field is generated, and have a relatively small diameter.

Insulating gas 7 sealed within the earth metal container 1 and the insulating spacer 3 insulate the high voltage area of the gas-insulated switchgear from the earth potential. The outer surfaces of the shielding electrodes 6 having the shield coverings 6a and the high-voltage conductors 2 are covered with thick dielectric coatings 8 and thin dielectric coatings 9, respectively.

FIG. 2 compares the minimum breakdown electric field of the bare electrode with the minimum breakdown electric fields of the thick dielectric coating 8 and the thin dielectric coating 9. This figure includes the theoretical value of the breakdown electric field of $SF_6$ gas for reference.

As apparent from FIG. 2, the ratio of the minimum breakdown electric fields of the thick dielectric coating 8 to the thin dielectric coating 9 to the bare electrode is approximately 1.45:1.15:1. Thus, when the ratio of the maximum electric field intensity of the shielding electrode 6 to the electric field intensity of the high-voltage conductor is about 1.25:1, the breakdown electric fields of the shielding electrode 6 where the maximum electric field is generated and the high-voltage conductor 2 can be equalized by covering the shielding electrode 6 with the thick dielectric coating 8, which increases the dielectric strength of the shielding electrode 6 to about 1.45 times higher than that of the bare electrode, and by covering the surface of the high-voltage conductor 2 with the thin dielectric coating 9, which increases the dielectric strength of the high-voltage conductor 2 to about 1.15 times higher than that of the bare electrode. Accordingly, the optimum insulation design having a miniaturized structure of the entire device can be provided.

In the first embodiment, the thick dielectric coating 8 is made of epoxy resin, fluorocarbon resin, phthalic resin, and other materials. The thin dielectric coating 9 is made of epoxy resin, fluorocarbon resin, or aluminum oxide ($Al_2O_3$) produced by applying electrolytic oxidation treatment to aluminum alloy, phthalic resin, and other materials. The preferable dielectric coating 8 and dielectric coating 9 can be produced from these materials.

In this embodiment, $SF_6$ gas is used as the insulating gas sealed within the respective components. However, a single element of dried air, $N_2$, $CO_2$, $O_2$, C—$C_4F_8$, $CF_3I$, or others may be used, or two or a larger number of elements of these may be used as mixed gas.

The gas-insulated equipment in the first embodiment according to the invention includes: the voltage-stressed areas to which predetermined voltage is applied; the conductive container as the earth metal container 1 for accommodating the voltage-stressed areas; and the insulating gas for electrically insulating the voltage-stressed areas. The voltage-stressed areas are constituted by the shielding electrodes 6 and the high-voltage conductors 2. The shielding electrodes 6 produce the electric field shield SH and have the shield coverings 6a. The high-voltage conductors 2 form the high-voltage section CN. The first voltage-receiving portions of the voltage-stressed areas, at which portions relatively high electric field including the maximum electric field is generated, are formed by the shielding electrodes 6 which produce the electric field shield SH and have shield coverings 6a. The first voltage-receiving portions are coated with the relatively thick dielectric coatings 8. The second voltage-receiving portions at least as a part of the voltage-stressed areas other than the first voltage receiving portions including the shielding electrodes 6 which produce the electric field shield SH and have the shield coverings 6a, at which portions lower electric field than that at the first voltage-receiving portions is generated, are formed by the high-voltage conductors 2 which form the high-voltage section CN. The second voltage-receiving portions are coated with the relatively thin dielectric coatings 9. Thus, dielectric strength of the entire voltage-stressed area of the gas-insulated equipment can be efficiently improved, considering electric field distribution of this area and improving insulation coordination. Accordingly, the entire structure of the gas-insulated equipment provided according to this embodiment can be miniaturized.

In the first embodiment according to the invention, the relatively thick dielectric coatings 8 applied to the shielding electrodes 6 as the first voltage-receiving portions which form the electric field shielding SH and have the shield coverings 6a, are made of epoxy resin or fluorocarbon resin, and the relatively thin dielectric coatings 9 applied to the second voltage-receiving portions are made of epoxy resin, fluorocarbon resin, or aluminum oxide ($Al_2O_3$) produced by applying electrolytic oxidation treatment to aluminum alloy in the above structure. Thus, dielectric strength of the entire voltage-stressed areas of the gas-insulated equipment can be efficiently improved, considering electric field distribution of these areas and improving insulation coordination. Accordingly, the gas-insulated equipment provided according to this embodiment has preferable dielectric coatings in the compact entire structure.

In the first embodiment according to the invention, the insulating gas for electrically insulating the shielding electrodes 6 as the voltage-receiving portion which form the electric field shield SH and have the shielding coverings 6a and the high-voltage conductors 2 as the voltage receiving portion which form the high-voltage section CN is constituted by a single element of $SF_6$ gas, dried air, $N_2$, $CO_2$, $O_2$, C—$C_4F_8$, $CF_3I$, or others, or two or a larger number of these elements as mixed gas in the above structure. Thus, dielectric strength of the entire voltage-stressed areas of the gas-insulated equipment can be efficiently improved, considering electric field distribution of these areas and improving insulation coordination. Accordingly, the gas-insulated equipment provided according to this embodiment securely obtains appropriate gas insulation in the compact entire structure.

Second Embodiment

Figure 3:
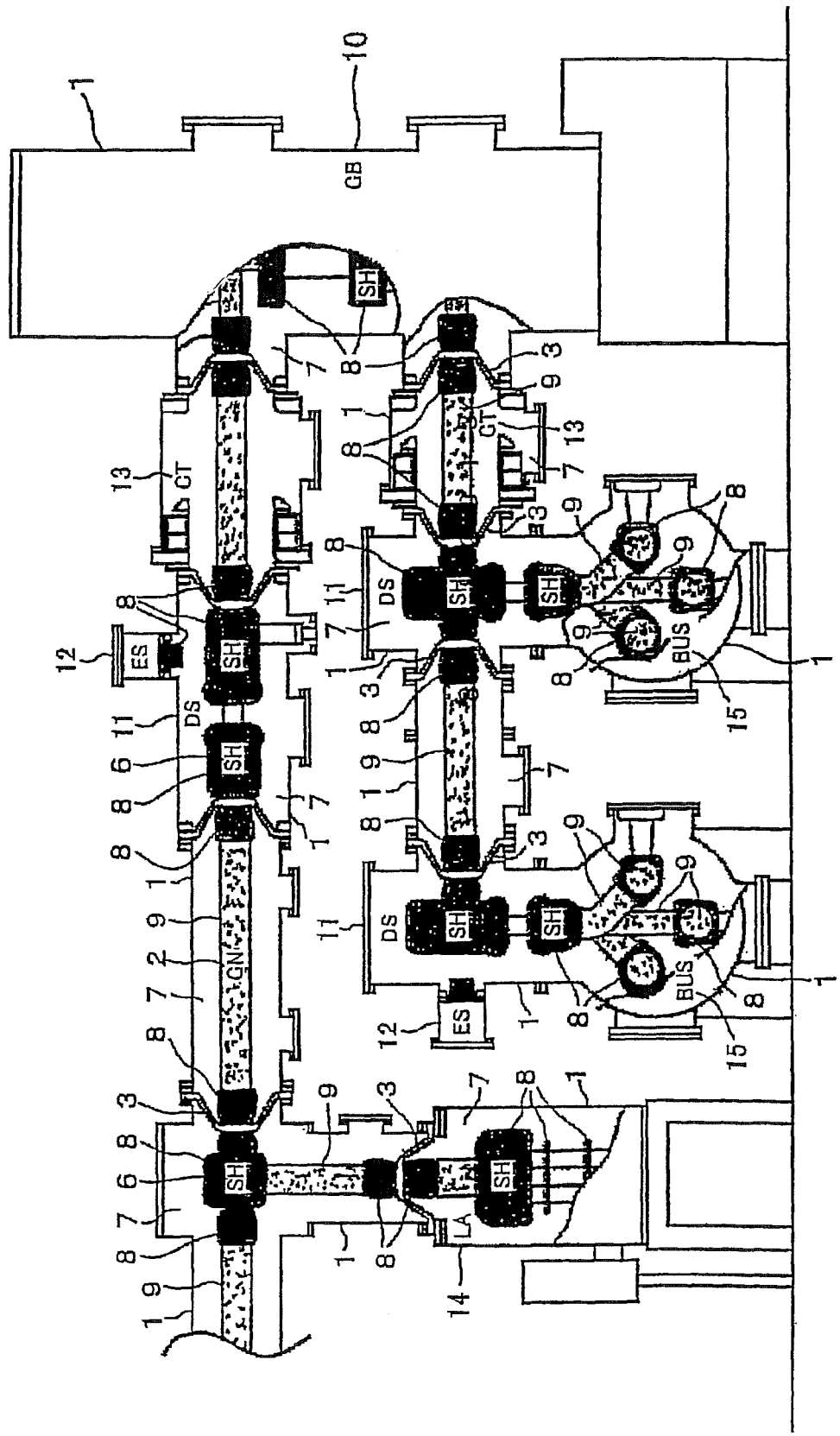
FIG. 3 is a cross-sectional view showing a structure of a gas-insulated switchgear in a second embodiment according to the invention.
Figure 4:
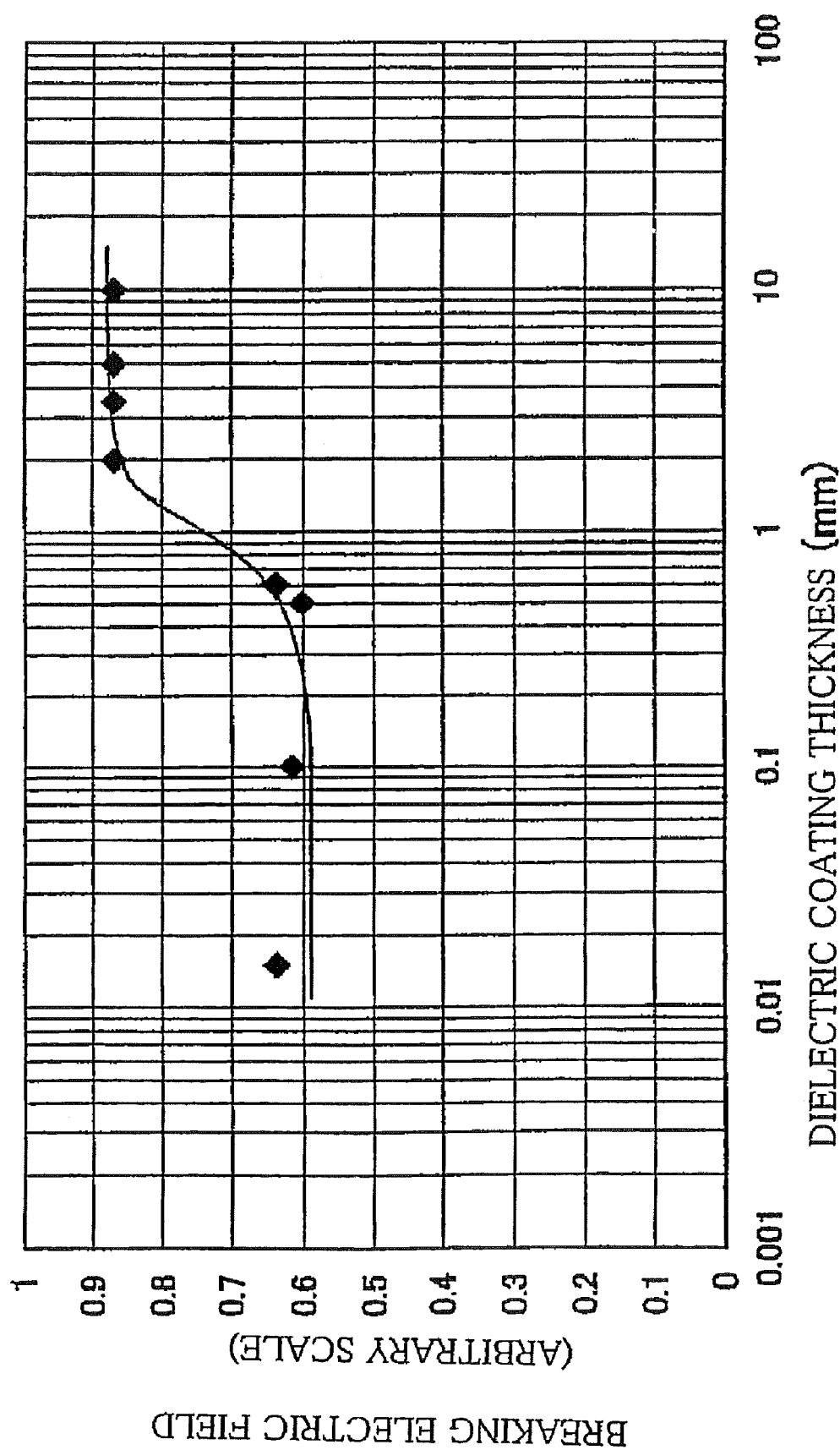
FIG. 4 is a characteristic diagram showing the relationship between breakdown electric field at an electrode covered with dielectric coating and the thickness of the dielectric coating as basic data for the invention.
Figure 5:
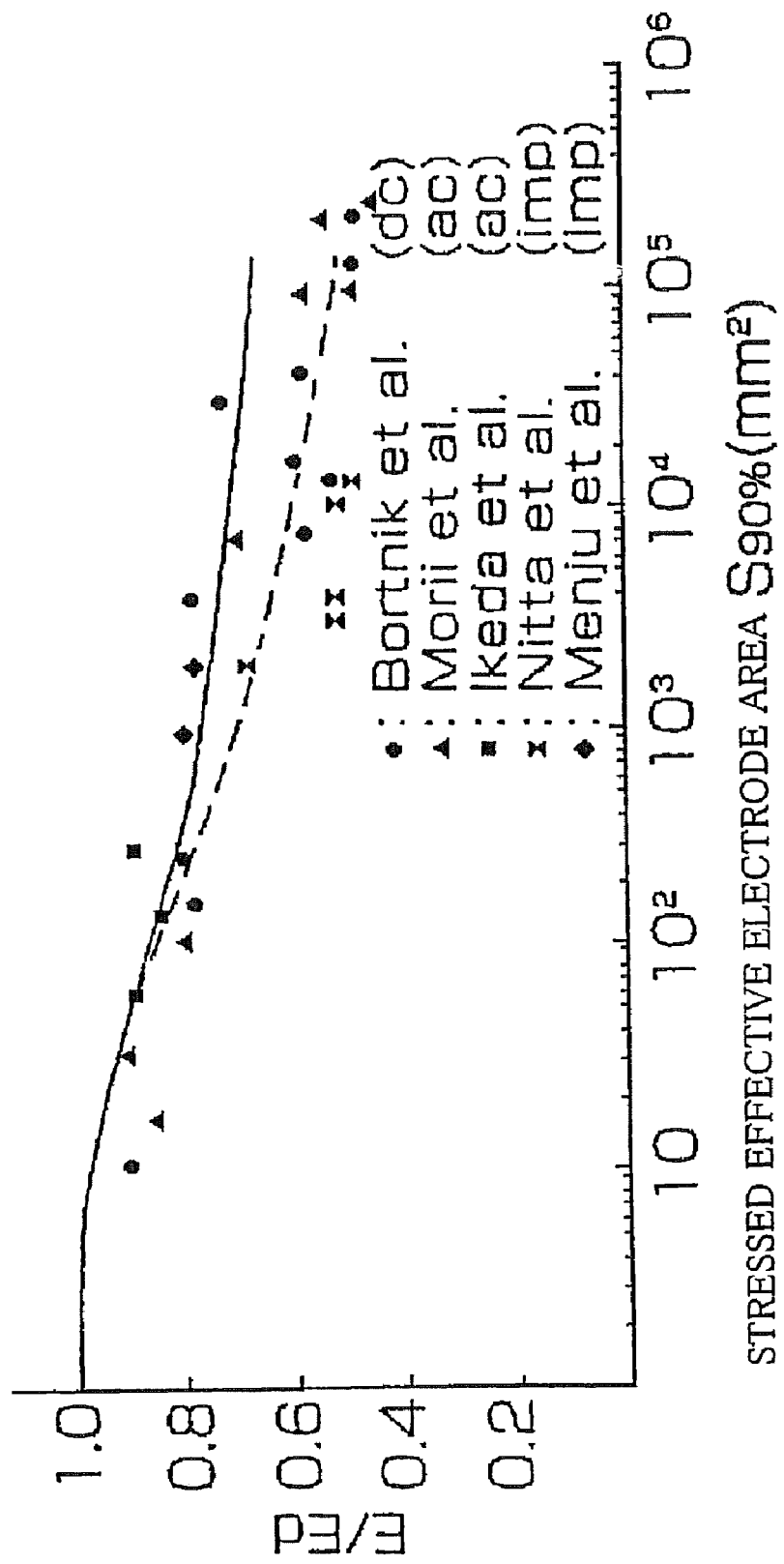
FIG. 5 shows dependency of breakdown electric field at an electrode on effective electrode area used as reference data for explaining advantages of the invention (quoted from the Electricity Society: *Electric Discharge Handbook*, Ohmsha, 1998)

A second embodiment according to the invention is now described with reference to FIGS. 3 through 6. FIG. 3 is a cross-sectional view showing a structure of a gas-insulated switchgear in the second embodiment according to the invention. FIG. 4 is a characteristic diagram showing the relationship between breakdown electric field at an electrode covered with dielectric coating and the thickness of the dielectric coating as basic data for the invention. FIG. 5 is a diagram showing dependency of breakdown electric field at an electrode on effective electrode area used as reference data for explaining advantages of the invention (quoted from the Electricity Society: *Electric Discharge Handbook*, Ohmsha, 1998). FIGS. 6A and 6B are cross-sectional views showing a structure example of a gas-insulated switchgear. In FIGS. 6A and 6B, 90% of a larger part of the area at which the maximum electric field is generated is covered with thick dielectric coating, and the rest of the area is covered with thin dielectric coating. Those two coatings are smoothly connected with stepwise variation in the thickness of the coatings at the boundary. FIG. 6A is a cross-sectional view of the entire structure, and FIG. 6B is a partial enlarged view.

In the first embodiment, the connection between parts with the insulating spacer 3 interposed therebetween in the gas-insulated switchgear is shown as an example. However, the connection can be used in the respective components of the gas-insulated switchgear including a cutoff breaker (CB) 10, a disconnecting switch (DS) 11, an earth switch (ES) 12, an instrument current transformer (CT) 13, a lightning arrestor (LA) 14, a main bus (BUS) 15, and others in the second embodiment as illustrated in FIG. 3.

As shown in FIG. 3, large-diameter shielding electrodes at which the maximum electric field is generated are covered with the thick dielectric coatings 8, and high-voltage conductor sections as the live parts of the main circuit having a smaller diameter than that of the shielding electrodes are covered by the thin dielectric coatings 9 in the respective components. Thus, the insulation design of the entire gas-insulated switchgear is optimized, allowing its structure to be made compact. The insulation design can be rationalized when the maximum electric fields of the respective components are set at the same intensity.

As for the earth switch (ES) 12, the thick dielectric coating 8 is applied to the earth potential electrode. Since the maximum electric field is generated at this area, this invention is effectively applied. Thus, the thick dielectric coating 8 can be effectively applied to a portion at which higher electric field is generated than that generated at the high-voltage conductor 2 even on the earth potential side. When high electric field, though not the maximum, is generated on the earth potential side such as the inner surface of the earth metal container 1 in the respective components of the gas-insulated switchgear which has been further miniaturized, the thin dielectric coating 9 can be effectively applied to the inner surface of the earth metal container 1.

While the gas-insulated swtchgear with three-phase enclosure type busbar is shown in FIG. 3, the invention is similarly applicable to entire three-phase packaged type and single-phase enclosure type gas-insulated switchgears.

In the second embodiment, the thick dielectric coating 8 is made of epoxy resin, fluorocarbon resin, phthalic resin, and other materials. The thin dielectric coating 9 is made of epoxy resin, fluorocarbon resin, or aluminum oxide ($Al_2O_3$) produced by applying electrolytic oxidation treatment to aluminum alloy, phthalic resin, and other materials similarly to the first embodiment.

FIG. 4 shows the relationship between breakdown electric field of an electrode covered with dielectric coating and the thickness of the dielectric coating. As apparent from the figure, the thickness of dielectric coating for producing superiority difference in breakdown electric field is approximately 1 mm or larger for the thick film, and smaller than 1 mm for the thin film.

As shown in FIG. 5, it is known that breakdown electric field at an electrode exhibits large dependency on the electrode area where the maximum electric field is generated within the range of 90% of that area (effective electrode area S90%). Thus, the entire surfaces of the respective shielding electrodes as shown in FIG. 1, or the 90% or a larger part of the area where the maximum electric field is generated may be covered with the thick dielectric coatings 8, and the rest of the area may be covered with the thin dielectric coatings 9 as shown in FIG. 6. When the thick dielectric coating 8 and the thin dielectric coating 9 are co-used for the same shielding electrode 6 as in this case, the coatings 8 and 9 may be smoothly connected with stepwise variation in the thickness of those so as to prevent discontinuous connection therebetween at the boundary and to equalize electric field distribution at the boundary.

The insulating gas sealed within the respective components is not limited to $SF_6$ gas in this embodiment but may be constituted by a single element of dried air, $N_2$, $CO_2$, $O_2$, $C$—$C_4F_8$, $CF_3I$, or others, or two or a larger number of these elements as mixed gas.

The gas-insulated equipment in the second embodiment according to the invention includes: the voltage-stressed areas to which predetermined voltage is applied; the conductive container as the earth metal container 1 for accommodating the voltage-stressed areas; and the insulating gas for electrically insulating the voltage-stressed areas. The voltage-stressed areas are constituted by the shielding electrodes 6 and the high-voltage conductors 2. The shielding electrodes 6 produce the electric field shield SH and have shield coverings 6a. The high-voltage conductors 2 form the high-voltage section CN. The first voltage-receiving portions of the voltage-stressed areas, at which portions relatively high electric field including the maximum electric field is generated, are formed by the shielding electrodes 6 which produce the electric field shield SH and have shield coverings 6a. The first voltage-receiving portions are coated with the relatively thick dielectric coatings 8. The second voltage-receiving portions at least as a part of the voltage-stressed areas other than the first voltage receiving portions including the shielding electrodes 6 which produce the electric field shield SH and have the shield coverings 6a, at which portions lower electric field than that at the first voltage-receiving portions is generated, are formed by the high-voltage conductors 2 which produce the high-voltage section CN. The second voltage-receiving portions are coated with the relatively thin dielectric coatings 9. The thickness of the relatively thick dielectric coatings 8 applied to the first voltage-receiving portions formed by the shielding electrodes 6 which produce the electric field shield SH and have shield coverings 6a is 1 mm or larger. The thickness of the relatively thin dielectric coatings 9 applied to the second voltage-receiving portions formed by the high-voltage conductors 2 which produce the high-voltage section CN is smaller than 1 mm. Thus, by the thick-film and thin dielectric coatings having the predetermined thickness, dielectric strength of the entire voltage-stressed areas of the gas-insulated equipment can be efficiently improved, considering electric field distribution of these areas and improving insulation coordination. Accordingly, the entire structure of the gas-insulated equipment provided according to this embodiment can be miniaturized.

The gas-insulated equipment in the second embodiment according to the invention includes: the voltage-stressed areas to which predetermined voltage is applied; the conductive container as the earth metal container 1 for accommodating the voltage-stressed areas; and the insulating gas for electrically insulating the voltage-stressed areas. The voltage-stressed areas are constituted by the shielding electrodes 6 and the high-voltage conductors 2. The shielding electrodes 6 produce the electric field shield SH and have shield coverings 6a. The high-voltage conductors 2 form the high-voltage section CN. The first voltage-receiving portions of the voltage-stressed areas, at which portions relatively high electric field including the maximum electric field is generated, are formed by the shielding electrodes 6 which produce the electric field shield SH and have shield coverings 6a. The first voltage-receiving portions are coated with the relatively thick dielectric coatings 8. The second voltage-receiving portions at least as a part of the voltage-stressed areas other than the first voltage receiving portions including the shielding electrodes 6 which produce the electric field shield SH and have the shield coverings 6a, at which portions lower electric field than that at the first voltage-receiving portions is generated, are formed by the high-voltage conductors 2 which produce the high-voltage section CN. The second voltage-receiving portions are coated with the relatively thin dielectric coatings 9. The relatively thick dielectric coatings 8 are applied to the entire surfaces of the voltage-receiving portions formed by the shielding electrodes 6 which produce the electric field shield SH and have shield coverings 6a, or 90% or larger parts of the voltage-receiving portions at which the maximum electric field is generated. The relatively thin dielectric coatings 9 are applied to the rest of the voltage-receiving portions. Thus, by limiting the areas to which the thick dielectric coatings are applied, dielectric strength of the entire voltage-stressed areas of the gas-insulated equipment can be efficiently improved, considering electric field distribution of these areas and improving insulation coordination. Accordingly, the entire structure of the gas-insulated equipment provided according to this embodiment can be miniaturized.

In the second embodiment according to the invention, the thickness of the dielectric coatings is varied stepwise at the boundary between the relatively thick dielectric coatings 8 and the relatively thin dielectric coatings 9 so that those coatings can be smoothly connected in the structures of the two cases described immediately above. Thus, dielectric strength of the entire voltage-stressed areas of the gas-insulated equipment can be efficiently improved, considering electric field distribution of these areas and improving insulation coordination. Accordingly, the entire structure of the gas-insulated equipment provided according to this embodiment can be miniaturized with the electric field at the thickness boundary of the dielectric coatings equalized.

In the second embodiment according to the invention, the relatively thick dielectric coatings applied to the first voltage-receiving portions are made of epoxy resin or fluorocarbon resin, and the relatively thin dielectric coatings applied to the second voltage-receiving portions are made of epoxy resin, fluorocarbon resin, or aluminum oxide ($Al_2O_3$) produced by applying electrolytic oxidation treatment to aluminum alloy in the structure described above. Thus, dielectric strength of the entire voltage-stressed areas of the gas-insulated equipment can be efficiently improved, considering electric field distribution of these areas and improving insulation coordination. Accordingly, the entire structure of the gas-insulated equipment provided according to this embodiment can be miniaturized with the preferable dielectric coatings formed.

In the second embodiment according to the invention, the insulating gas for electrically insulating the voltage-stressed areas is formed by a single element of $SF_6$ gas, dried air, $N_2$, $CO_2$, $O_2$, C—$C_4F_8$, $CF_3I$, or others, or two or a larger number of these elements as mixed gas in the structure described above. Thus, dielectric strength of the entire voltage-stressed areas of the gas-insulated equipment can be efficiently improved, considering electric field distribution of these areas and improving insulation coordination. Accordingly, the entire structure of the gas-insulated equipment provided according to this embodiment can be miniaturized with gas-insulation securely obtained in an appropriate manner.

The following structures in (1) through (6) are proposed according to the invention:

(1) A gas-insulated switchgear which includes: insulating gas sealed within an earth metal container; an insulating spacer for insulating and supporting high-voltage conductors; and electrodes for electrically shielding live contacts which provide electrical connection between parts and an embedded energizing electrode of the insulating spacer, characterized in that: the portions of the electrodes at which the maximum electric field is generated are covered with thick dielectric coatings; and the portions of the electrodes at which high electric field is generated other than the above portions and the high-voltage conductors are covered with thin dielectric coatings.

(2) A gas-insulated switchgear according to (1), characterized in that: the thick dielectric coatings are made of epoxy resin or fluorocarbon resin, and the thin dielectric coatings are made of epoxy resin, fluorocarbon resin, or aluminum oxide ($Al_2O_3$) produced by applying electrolytic oxidation treatment to aluminum alloy.

(3) A gas-insulated switchgear according to (1) or (2), characterized in that: the thickness of the thick dielectric coatings is 1 mm or larger; and the thickness of the thin dielectric coatings is smaller than 1 mm.

(4) A gas-insulated switchgear according to any one of (1) through (3), characterized in that: the thick dielectric coatings are applied to the entire surfaces or 90% or larger parts of the electrodes at which the maximum electric field is generated; and the thin dielectric coatings are applied to the remaining parts of the electrodes at which the maximum electric field is generated.

(5) A gas-insulated switchgear according to (4), characterized in that the thickness of the dielectric coatings is varied stepwise at the boundary between the thick dielectric coatings and the thin dielectric coatings on the same electrode so that those coatings can be smoothly connected.

(6) A gas-insulated switchgear according to any one of (1) through (5), characterized in that: the insulating gas is formed by a single element of $SF_6$ gas, dried air, $N_2$, $CO_2$, $O_2$, C—$C_4F_8$, $CF_3I$, or others, or two or a larger number of these elements as mixed gas.

According to the invention, the thick-film coatings are applied to the portions around which the maximum electric field is generated, and the thin-film coatings are applied to the portions including the surfaces of the high-voltage conductors other than the portions to which the thick-film coatings are applied. Thus, dielectric strength of the entire electrode system of the gas-insulated switchgear can be efficiently improved, considering electric field distribution of the respective shielding electrodes and conductors and improving insulation coordination. Accordingly, the entire structure of the gas-insulated switchgear can be miniaturized.

The invention is applicable to a gas-insulating switchgear used for electric power applications which is considerably miniaturized, for example.

What is claimed is:
1. A gas-insulated device, comprising:
an earth metal container with earth potential;
insulating gas sealed within the earth metal container;
a high-voltage conductor disposed in the earth metal container;
a shielding electrode disposed in the earth metal container and connected to the high-voltage conductor; and
an insulating spacer;
wherein the high-voltage conductor and the shielding electrode are insulated from the earth metal container by the insulating spacer and the insulating gas;
the shielding electrode has a larger diameter than that of the high-voltage conductors;
the shielding electrode is covered with relatively thick dielectric coatings;
the high-voltage conductor is covered with relatively thin dielectric coatings; and
each thickness of the relatively thick dielectric coatings and the relatively thin dielectric coatings is such a thickness that breakdown electric fields of the shielding electrode and the high-voltage conductor are equalized.

2. A gas-insulated device according to claim 1, wherein
the thickness of the relatively thick film dielectric coatings applied to the first voltage receiving portions is 1 mm or larger; and
the thickness of the relatively thin film dielectric coatings applied to the second voltage receiving portions is smaller than 1 mm.

3. A gas-insulated device according to claim 1, wherein
the relatively thick film dielectric coatings are applied to the entire surfaces or 90% or larger parts of the voltage-receiving portions at which the maximum electric field is generated; and
the relatively thin film dielectric coatings are applied to the rest of the voltage-receiving portions at which the maximum electric field is generated.

4. A gas-insulated device according to claim 2, wherein
the relatively thick film dielectric coatings are applied to the entire surfaces or 90% or larger parts of the voltage-receiving portions at which the maximum electric field is generated; and
the relatively thin dielectric coatings are applied to the rest of the voltage-receiving portions at which the maximum electric field is generated.

5. A gas-insulated device according to claim 1, wherein the thickness of the dielectric coatings varies stepwise at the boundary between the relatively thick film dielectric coatings and the relatively thin dielectric coatings so that those coatings can be smoothly connected.

6. A gas-insulated device according to claim 4, wherein the thickness of the dielectric coatings varies stepwise at the boundary between the relatively thick dielectric coatings and the relatively thin dielectric coatings so that those coatings can be smoothly connected.

7. A gas-insulated device according to claim 1, wherein
the relatively thick dielectric coatings applied to the first voltage-receiving portions are made of epoxy resin or fluorocarbon resin, and the relatively thin dielectric coatings applied to the second voltage-receiving portions are made of epoxy resin, fluorocarbon resin, or aluminum oxide ($Al_2O_3$) produced by applying electrolytic oxidation treatment to aluminum alloy.

8. A gas-insulated device according to claim 6, wherein
the relatively thick dielectric coatings applied to the first voltage-receiving portions are made of epoxy resin or fluorocarbon resin, and the relatively thin dielectric coatings applied to the second voltage-receiving portions are made of epoxy resin, fluorocarbon resin, or aluminum oxide ($Al_2O_3$) produced by applying electrolytic oxidation treatment to aluminum alloy.

9. A gas-insulated device according to claim 1, wherein the insulating gas for electrically insulating the voltage-receiving areas is formed by a single element of $SF_6$ gas, dried air, $N_2$, $CO_2$, $O_2$, $C-C_4F_8$, $CF_3I$, or others, or two or a larger number of these elements as mixed gas.

10. A gas-insulated device according claim 8, wherein the insulating gas for electrically insulating the voltage-receiving areas is formed by a single element of $SF_6$ gas, dried air, $N_2$, $CO_2$, $O_2$, $C-C_4F_8$, $CF_3I$, or others, or two or a larger number of these elements as mixed gas.

11. A gas-insulated device according to claim 1, wherein each thickness of the relatively thick dielectric coatings and the relatively thin dielectric coatings is such a thickness that breakdown electric fields between the high-voltage conductor and the earth metal container and breakdown electric fields between the shielding electrode and the earth metal container are substantially the same.

\* \* \* \* \*